Figure 1:
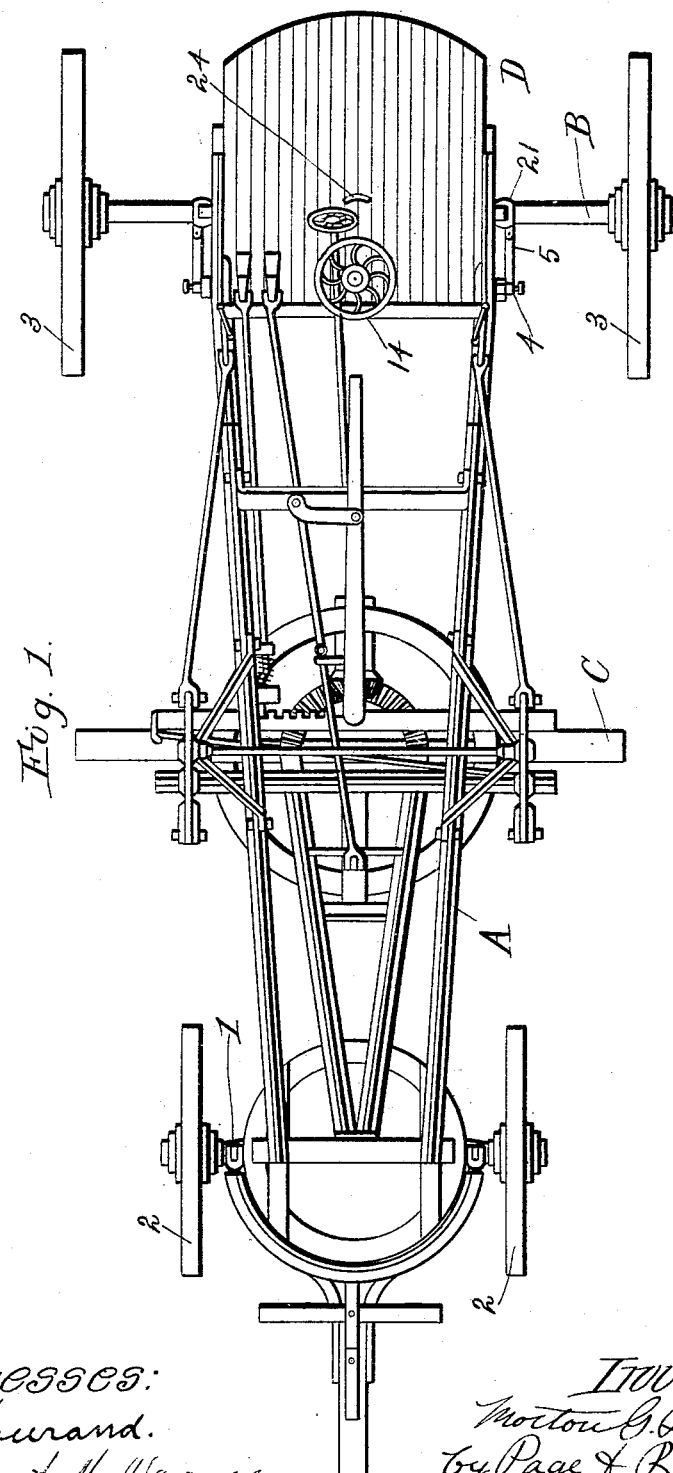

No. 618,024. Patented Jan. 17, 1899.
M. G. BUNNELL.
MACHINE FOR MAKING AND REPAIRING ROADS.
(Application filed Aug. 9, 1897.)

(No Model.) 5 Sheets—Sheet 2.

Witnesses:
A. F. Durand.
Margant M. Wagner

Inventor:
Morton G. Bunnell
by Page & Belfield
attys

No. 618,024. Patented Jan. 17, 1899.
M. G. BUNNELL.
MACHINE FOR MAKING AND REPAIRING ROADS.
(Application filed Aug. 9, 1897.)
(No Model.) 5 Sheets—Sheet 3.
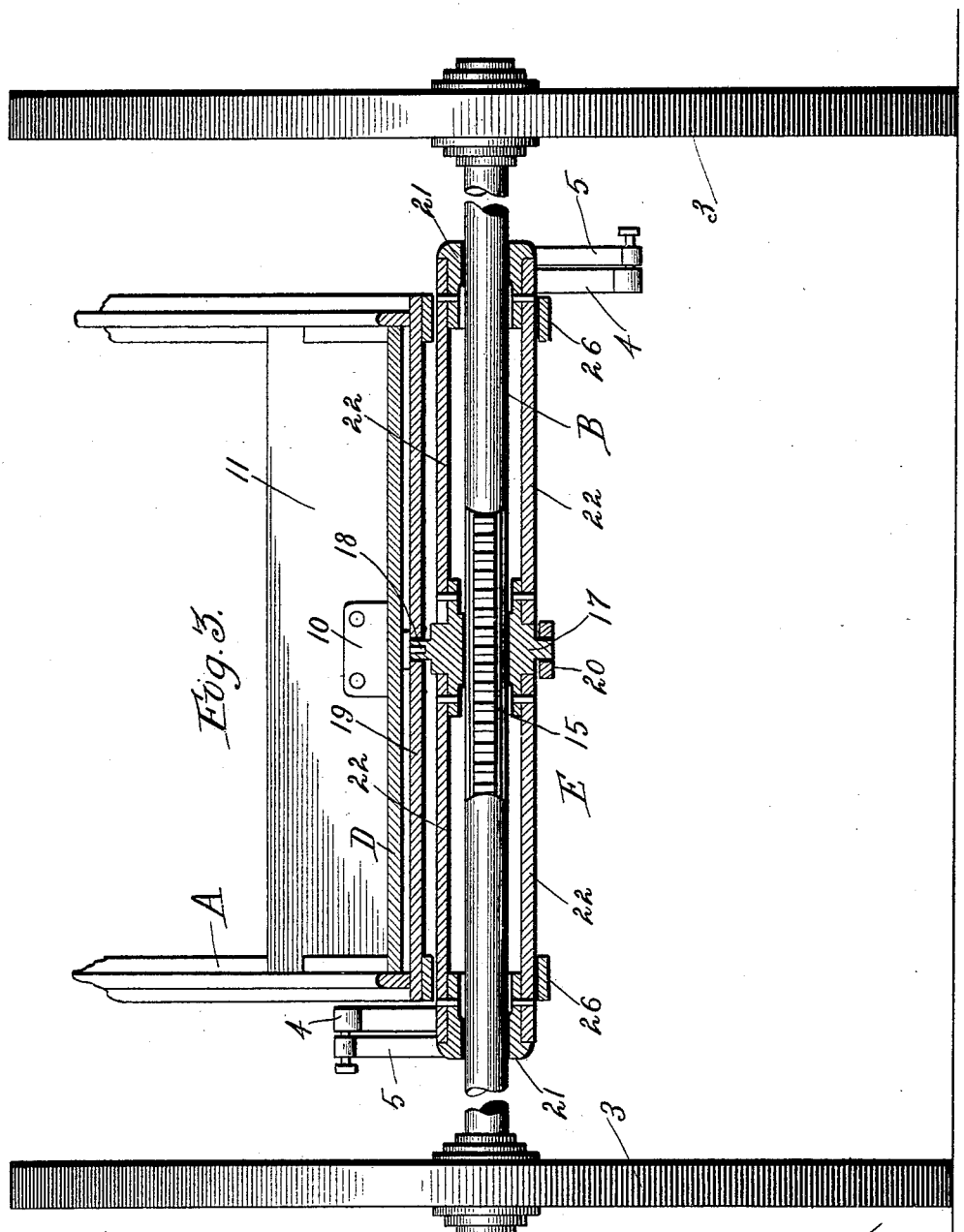
Witnesses: A. F. Durand. Margaret M. Wagner.
Inventor: Morton G. Bunnell by Page & Belfield attys.

No. 618,024. Patented Jan. 17, 1899.
M. G. BUNNELL.
MACHINE FOR MAKING AND REPAIRING ROADS.
(Application filed Aug. 9, 1897.)
(No Model.) 5 Sheets—Sheet 4.
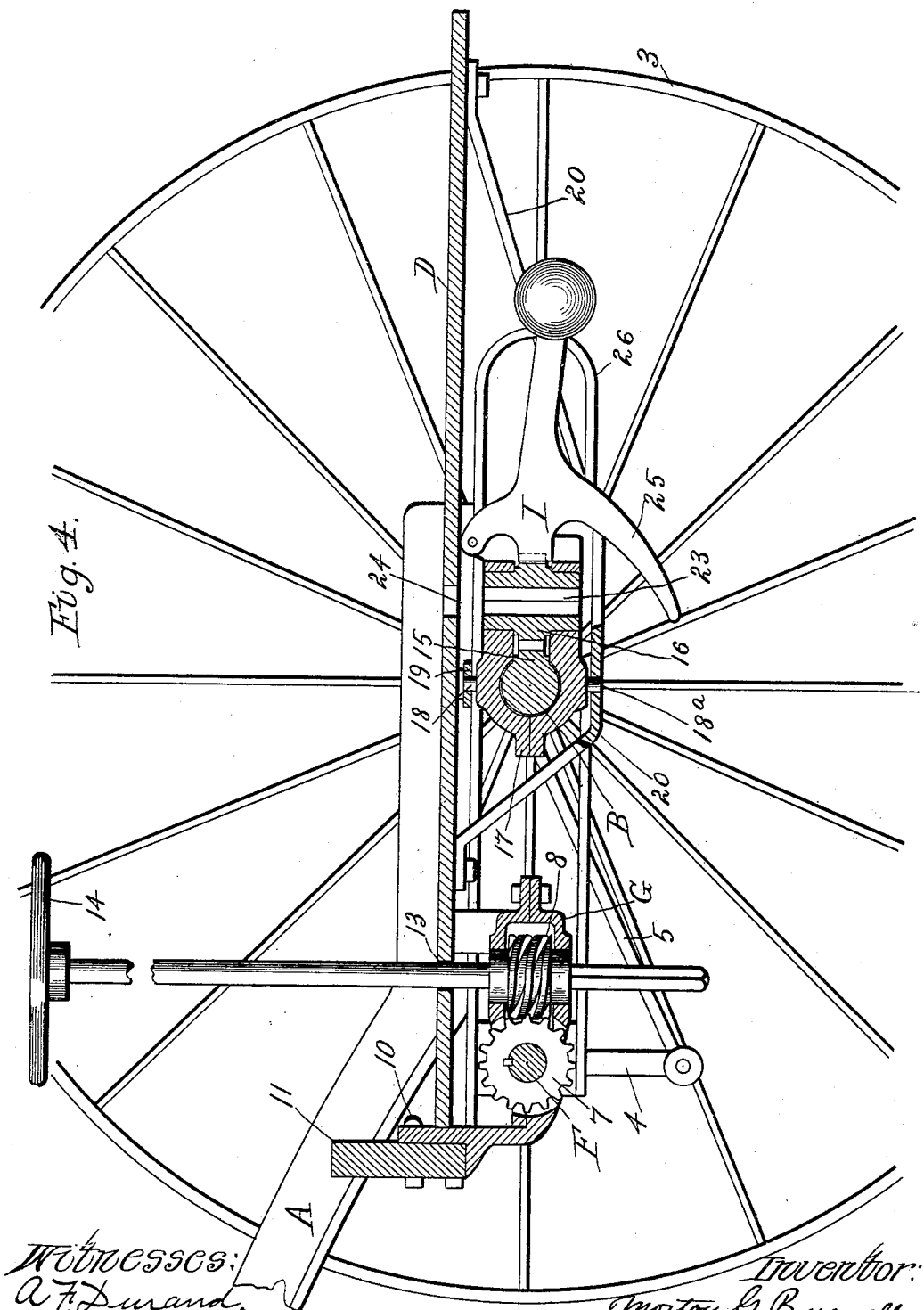
Witnesses:
A. F. Durand.
Margaret M. Wagner
Inventor:
Morton G. Bunnell
by Page & Belfield
Attys No. 618,024. Patented Jan. 17, 1899.
M. G. BUNNELL.
MACHINE FOR MAKING AND REPAIRING ROADS.
(Application filed Aug. 9, 1897.)
(No Model.) 5 Sheets—Sheet 5.
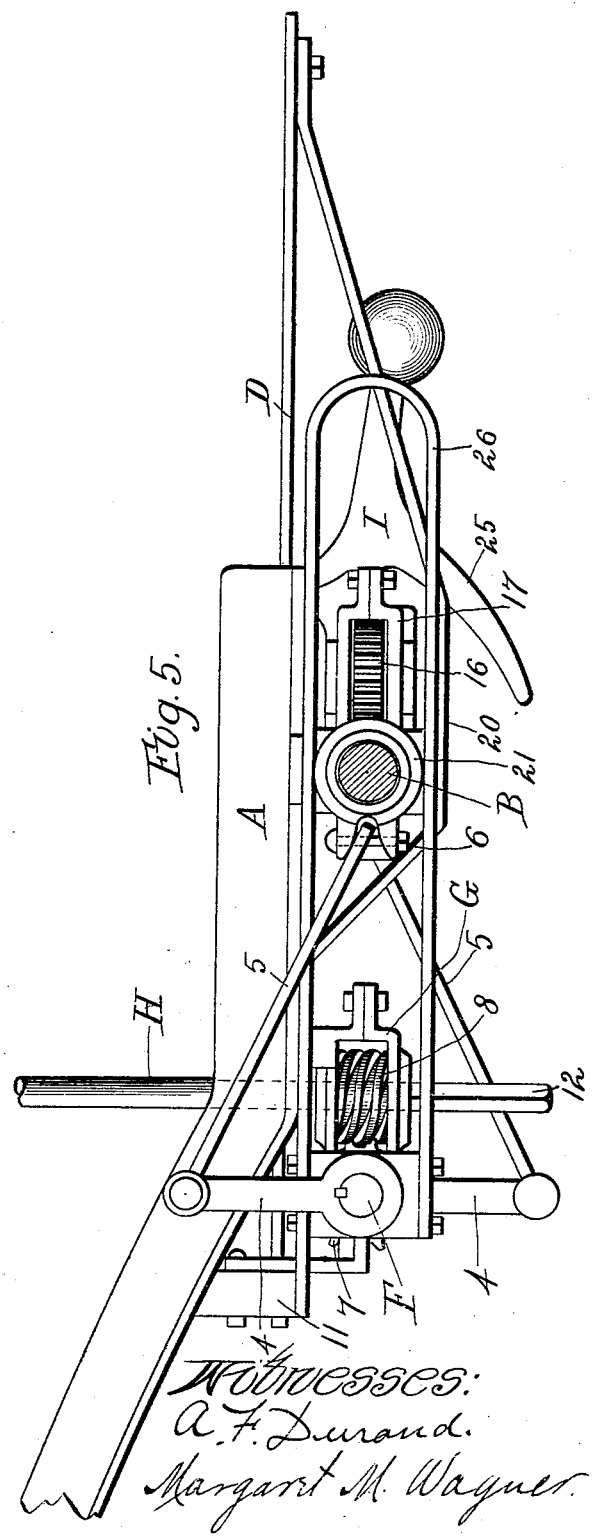
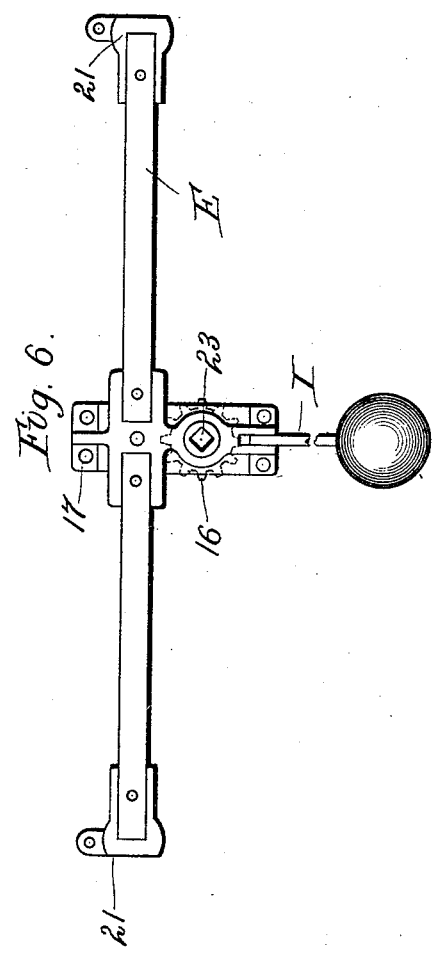
Witnesses:
A. F. Durand.
Margaret M. Wagner.
Inventor:
Morton G. Bunnell
by Page & Belfield
attys.

UNITED STATES PATENT OFFICE.

MORTON G. BUNNELL, OF CHICAGO, ILLINOIS, ASSIGNOR TO FREDERICK C. AUSTIN, OF SAME PLACE.

MACHINE FOR MAKING AND REPAIRING ROADS.

SPECIFICATION forming part of Letters Patent No. 618,024, dated January 17, 1899.

Application filed August 9, 1897. Serial No. 647,567. (No model.)

*To all whom it may concern:*

Be it known that I, MORTON G. BUNNELL, a citizen of the United States, residing at Chicago, in the county of Cook and State of Illinois, have invented a certain new and useful Improvement in Machines for Making and Repairing Roads, of which the following is a specification.

My invention relates to a construction of road-making and road-repairing machine involving a carriage or body-frame having front and rear wheels and provided with a long scraper-blade arranged between the front and rear wheels and associated with means for varying its horizontal angle relatively to the line of progression of the machine. In machines of this general character various means have been devised for varying the relative position of the rear axle and its wheels to the body-frame and scraper-blade. For example, the body-frame of the machine has been supported upon and connected with a long rear axle by a sliding connection, so that by operating a hand-wheel shaft carried by the body-frame and having a pinion engaging a rack on the rear axle the body-frame can be shifted toward either rear wheel, as in Letters Patent of the United States No. 362,679, the result secured by such arrangement having also been attained in several instances by a longitudinally-divided extensible rear axle, of which illustration is afforded by Letters Patent of the United States Nos. 365,847 and 533,561. In both cases, however, the rear axle, broadly considered, whether single or divided, is longitudinally adjustable in opposite directions for the purpose of placing the body-frame either equidistant between the wheels or nearer to one wheel than to the other wheel, and in this way either rear wheel can be made to run in the track of the wheel ahead of it. As another way of varying the relative position of the rear axle and its wheels to the body-frame and scraper-blade the rear axle has been pivotally connected with the body-frame, whereby either end of the rear axle can be positioned ahead of the other, such arrangement being particularly desirable as a means for overcoming side draft. It has been also proposed to combine certain functions involved in the foregoing-mentioned examples in one machine, as illustrated by Letters Patent of the United States No. 379,679, dated March 20, 1888, which shows and describes the rear axle having a sliding connection with a bearing-block, which is in turn pivotally attached to the body-frame at one side of the latter, the said axle also having a sliding connection with a hub which is connected with the opposite side of the body-frame by a guideway arranged to permit such hub to move forwardly and rearwardly when operated upon by an adjusting-screw held by guides on the body-frame.

My invention contemplates the avoidance of various defects and disadvantages heretofore involved, the provision of a construction and organization affording freer and wider range of action, the provision of a more complete and practical embodiment in one machine of all of the functions severally incident to the aforesaid several machines in a novel, effective, and simple way, and the securement of effective means for holding the rear axle.

To the attainment of the foregoing and other useful ends my improved machine comprises a diagonally-adjustable scraper-blade arranged between the front and rear wheels, a carriage or body-frame having its forward end supported upon a short swinging front axle and having its rear end supported upon and connected with a vibratory adjustable rear bolster which can be swung independently of the body-frame and which is connected with an adjustable rear axle capable of longitudinal adjustment independently of such bolster, whereby either rear wheel can be set out from or brought near to the body-frame at will.

The rear bolster is desirably arranged to swing about a vertical axis or center located at the middle of the rear part of the body-frame and can be made of a length to form a couple of lever-arms extending in opposite directions from its middle portion, so that by applying suitable power to the ends of said arms the bolster can be readily swung for the purpose of skewing the rear axle. As a further important point involved in such arrangement each end of the bolster can be swung forward to the same extent, in which way a greater range of action is attained than is possible where the axle is pivotally held at one side of the body-frame, and, further, the machine is better adapted for a reversible scraper, which can be adjusted so as to place either of its ends ahead. The provision of a rear bolster arranged to swing independently of the body-frame also affords a substantial support for the rear end of the body-frame intermediate of the body-frame and axle and also provides a most effective holder for the adjustable axle, which can be extended in either direction from the bolster.

By operating mechanism for sliding the bolster along the rear axle or adjusting such rear axle longitudinally the body-frame can be set over toward either rear wheel in accordance with requirements. For example, if the bolster is skewed so as to skew the rear axle the rear wheels will tend to run to one side, and hence during the operation of the machine the body-frame will assume a position oblique to the general line of progression. This, however, will tend to place one rear wheel in or near the track of the wheel ahead of it. In some cases such is desirable; in others objectionable. When objectionable, the objection can readily be removed by vibrating the bolster upon the rear axle to a desired extent. It will therefore be seen that the rear axle can be skewed so as to move either of its wheels ahead, and that the body-frame can be readily set over toward either of such wheels with reference to the horizontal angle of the axle relatively to the length of the body-frame, and that both of such adjustments can be made with reference to the position of the scraper-blade, the side draft to be overcome, and the tracks of the front wheels; also, that the axle can be skewed both ways to a like extent.

Figure 2:
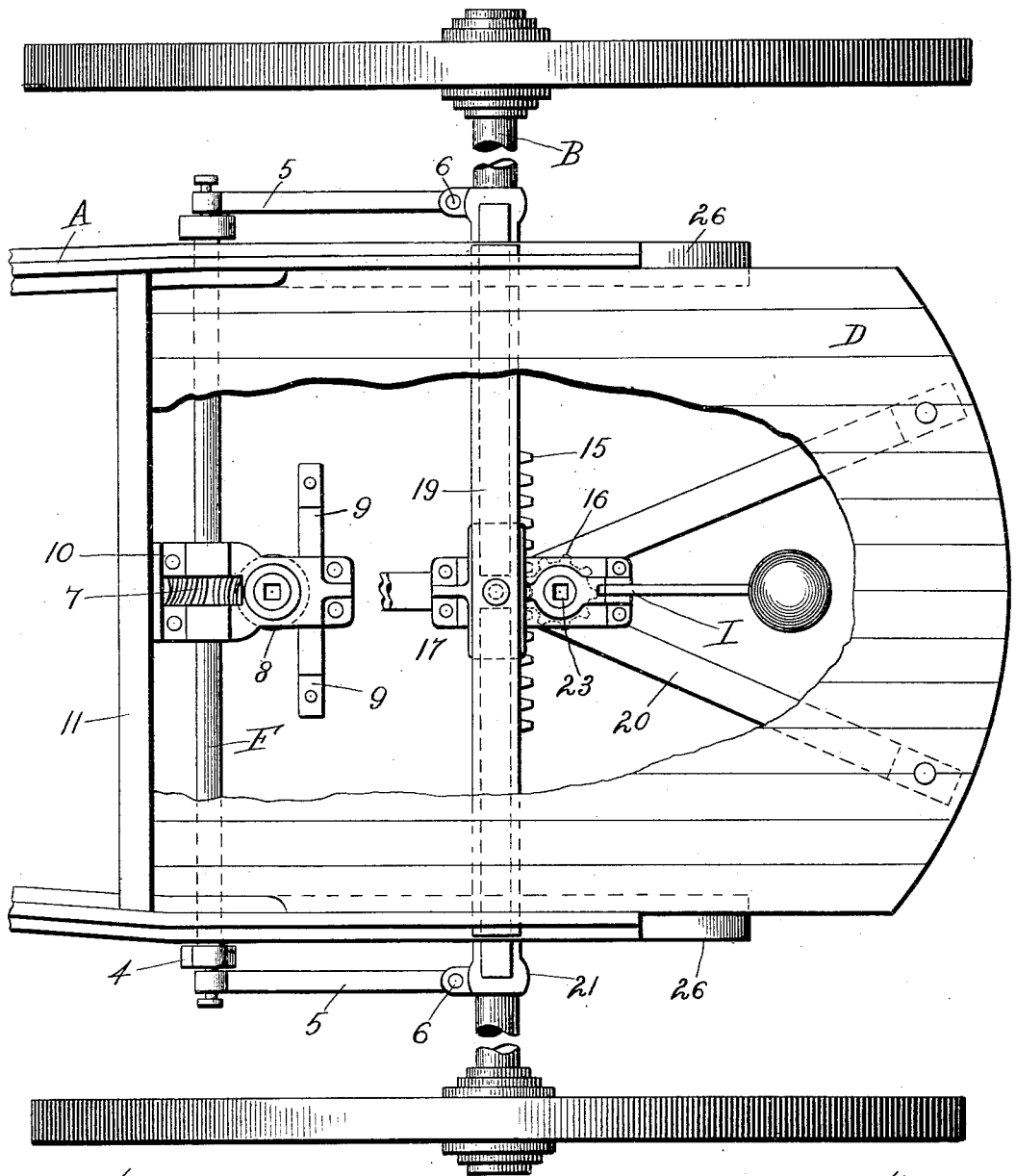

In the accompanying drawings, Figure 1 is a top plan view of a road making and repairing machine embodying my invention. Fig. 2 is a like view of the rear end portion of the machine on a larger scale, a portion of the rear platform and portions of the rear axle being broken away. Fig. 3 is a transverse section on a vertical plane through the rear platform and vibratory bolster, the rear axle being shown in elevation and having portions broken away for convenience of illustration. Fig. 4 is a longitudinal section taken on a vertical central plane through the portion of the machine illustrated in Fig. 2, the hand-wheel, which is omitted in Fig. 2, being shown in elevation with a portion of the rod on which it is arranged broken away for convenience of illustration. Fig. 5 shows the rear end portion of the machine in side elevation, the rear axle being in cross-section on a plane between the body-frame and wheel at this side of the machine. Fig. 6 is a top plan view of the rear bolster.

The body-frame A of the machine is pivotally supported at its forward end upon a short axle 1, having wheels 2 2. The front axle can therefore be swung around by the team in turning, and the body-frame can also be swung laterally and independently of the front axle.

At the rear end of the machine is a relatively long non-rotating rear axle B, provided with wheels 3 3, which turn independently of the axle. The scraper-blade C is arranged between the front and rear wheels and is diagonally adjustable, whereby its horizontal angle relatively to the line of progression of the machine can be varied in accordance with requirements, it being desirable that the blade should be arranged so that either of its ends can be placed ahead. The rear end of the body-frame is constructed with a platform D for an attendant, and the devices or mechanism for adjusting the scraper-blade are arranged so as to be accessible to and under the control of an attendant standing upon said platform. Any known or suitable means for adjusting the scraper-blade can be employed, and hence a detail description of such means is not necessary.

The body-frame A is at a point between the sides of its rear end portion pivoted upon a rear bolster E at a point between the end portions of the latter, and said bolster is arranged for sliding adjustment upon and along the rear axle, by which arrangement, broadly considered and herein contemplated as a part of my invention, the swinging rear bolster is connected with the body-frame and arranged to swing about a vertical axis or center located between the sides of the body-frame. The rear bolster also carries mechanism for adjusting it along the rear axle toward either rear wheel at the will of an attendant standing upon the rear platform, and the body-frame carries an adjusting mechanism likewise subject to the control of said attendant and applied to both ends of the bolster, whereby the latter, together with the rear axle, can be skewed or swung horizontally in either direction independently of the body-frame about a vertical axis through the pivotal connection between the bolster and the body-frame regardless of the extent to which said vibratory bolster may have been adjusted along the axle toward either of the two rear wheels. In effect the vibratory bolster is formed with a couple of arms or levers extending in opposite directions from its middle portion, which is pivotally connected with the body-frame, and by applying power to the outer ends of such arms the bolster, together with the axle, can be swung by the attendant with comparative ease, so as to move and position either rear wheel ahead and thereby skew the rear axle during the operation of the machine.

A preferred mechanism herein provided for horizontally swinging or vibrating the rear bolster and for locking the rear axle at a desired horizontal angle comprises a rock-shaft F, arranged transversely to the length of the body-frame and mounted in suitable bearings on the latter. Each end of the rock-shaft is provided with a crank-arm 4, and upon these crank-arms are hung pitmen 5, which are in turn connected with the ends of the vibratory rear bolster by hinge connections, as at 6, Fig. 2. The crank-arms 4 project from the rock-shaft at relatively opposite angles, so that when the rock-shaft is operated one of the pitmen 5 will be drawn forward, while the other will be thrust rearwardly. This arrangement provides a simple and exceedingly effective mechanism for skewing the rear bolster in either direction and is herein provided as a matter of special improvement, although for the broader purposes of my invention other suitable mechanism for swinging the rear bolster can be employed. The rock-shaft is provided at a point between its ends with a gear or worm wheel 7, which is rigid with the rock-shaft and engaged and operated by a worm 8, arranged below the rear platform. The worm 8 is arranged to turn about a vertical axis and is journaled in a suitable bearing G, Figs. 4 and 5, which is in turn rigidly supported by the body-frame. This bearing G (see also Fig. 2) comprises a two-part casting having its parts suitably bolted together and provided with suitable bearing portions for the worm 8 and also with bearing portions for the rock-shaft. As illustrated in Fig. 2, said bearing G has lateral arms 9, which can be bolted either to the rear platform or to a cross-bar under the same, and also a forward end portion 10, which can be bolted to a cross-bar 11 on the body-frame. The forward portion of the bearing G is slotted, so as to afford space for the worm-wheel 7, and with such arrangement it has bearing portions for the rock-shaft at opposite sides of such worm-wheel. The worm 8 is provided with an axially-arranged socket into which the end 12 of an operating-key, such as a hand-wheel shaft H, can be temporarily fitted for the purpose of turning the worm. When the hand-wheel shaft is thus applied, it will rise from the worm through an opening 13, Fig. 4, in the platform, and in such position the hand-wheel 14 upon said shaft will be within convenient reach of an attendant standing upon the rear platform.

As a means for adjusting the rear bolster along the rear axle the latter is provided along its middle portion with a rack 15, and the rear bolster is provided with a gear-wheel 16, which engages the rack in the rear axle, so that by operating the gear-wheel the bolster can be caused to move along the axle toward either rear wheel, according to the direction in which the gear-wheel is turned and regardless of the horizontal angle of the bolster relatively to the length of the body-frame. The middle portion of the rear bolster comprises a two-part casting or bearing 17, having its parts bolted together and adapted and arranged to slide upon the rear axle. The upper half or part of this bearing 17, which forms the middle portion of the rear bolster, is provided with a trunnion or pivot 18, which is journaled in a cross-bar 19 on the body-frame of the machine. The lower half or part of said bearing 17 is similarly provided with a pivot 18ª, which is journaled in a bracket 20, arranged under and bolted to the rear platform, the said bracket being a bar which extends under the rear bolster and which is bent so as to provide ample space for the swinging movements of the rear bolster and rear axle. The journals or ends of the hub portion of the gear 16 are journaled in the upper and lower parts of the bearing 17, which for such purpose is formed with a rear extension, as shown in Figs. 2, 4 and 5, it being observed that this rear portion or extension of the bearing 17 is suitably recessed to provide space for the gear-wheel 16 and also to permit the same to engage the rack on the rear axle.

As a simple, light, strong, and efficient arrangement the rear bolster can have its middle portion 17 and its end portion 21 adapted to form bearings which engage and slide upon the rear axle, and with such arrangement the said middle and end portions can be rigidly connected together by upper and lower rods or bars 22, having their ends fitted to seats on the castings or bearings 17 and 21 and securely bolted thereto, as best shown in Fig. 3. The arrangement of the bearings 17 and 21 avoids undesirable friction between the rear bolster and rear axle and permits the said bolster to be shifted toward either rear wheel with comparative ease. The hub portion of the gear-wheel 16 is provided with a socket 23, Figs. 2 and 3, adapted to receive the end portion 12 of the hand-wheel shaft H, and the rear platform is provided with a segmental-shaped slot or opening 24, through which the hand-wheel shaft can pass when it is brought into engagement with the hub of the gear 16. By this arrangement the attendant can with one and the same hand-wheel shaft operate either the worm 8 or the gear 16 at will, it being only necessary to transfer the hand-wheel shaft from one to the other of said members, as occasion may require. By employing gearing both in the mechanism for adjusting the rear bolster longitudinally along the rear axle and in the mechanism for effecting a swinging adjustment on the part of said rear bolster the latter will be held in such relative position as it may be placed by said adjusting mechanisms; but to effectively lock the rear bolster against accidental shift along the rear axle the middle rear extension of said rear bolster is provided with a weighted swinging latch I, arranged to swing in a vertical plane and having its catch portion arranged for normally engaging and locking the gear 16. This catch I is also provided with a pendent arm 25, arranged to normally lie under the socket 23 in the hub of said gear. When the hand-wheel shaft is introduced into said socket 23, its lower end projects below the latter and engages and swings back the arm 25, which, being a part of the latch, causes the latter to swing out of engagement with the gear 16. So long, therefore, as the hand-wheel shaft is thus applied the gear 16 will be unlocked, and hence can be turned by operating the hand-wheel shaft.

From the foregoing it will be seen that an attendant standing upon the rear platform can at will shift the rear bolster, and consequently the rear end portion of the body-frame, toward either rear wheel and also swing or skew the rear bolster and rear axle independently of the body-frame about a vertical axis passing through the middle portion of such rear end part of the body-frame; also, that each arm of the rear bolster constitutes a long lever and that by applying the swinging power to the outer ends of such levers the rear axle can be easily swung so as to move either rear wheel ahead, regardless of the fact that the body-frame may have been shifted toward one or the other of such rear wheels. It will also be seen that when the rear bolster is shifted toward either rear wheel the rear bolster and the rear portion of the body-frame will as an entirety partake of said movement and that the bolster and axle can also be skewed both with reference to the position of the scraper-blade and the position of the rear end of the body-frame relatively to the rear wheels. It will also be seen that, if desired, the rear bolster can be made considerably longer than the width of the body-frame and that as a convenient arrangement its arms extend through horizontal guideways formed by bars 26, which are bent to form guides and secured to opposite side portions of the body-frame.

What I claim as my invention is—

1. A machine for making and repairing roads comprising a body-frame or carriage provided with a swinging front axle, a diagonally-adjustable scraper-blade arranged between the front and rear wheels; a vibratory adjustable rear bolster supporting and connected with the body-frame; means for vibrating and adjusting the rear bolster independently of the body-frame; and a longitudinally-adjustable rear axle which is connected with the rear bolster so as to swing therewith and which is longitudinally adjustable in opposite directions independently of said rear bolster, substantially as set forth.

2. A machine for making and repairing roads, comprising a body-frame pivoted at its forward end upon a wheeled axle; a vibratory rear bolster upon which the middle portion of the rear end of the body-frame is pivoted; a relatively long, rear wheeled axle upon which the rear bolster is supported for sliding adjustment; a diagonally-adjustable scraper-blade arranged between the front and rear wheels; adjusting mechanism for skewing the rear bolster and rear axle alternately in opposite directions; and adjusting mechanism for adjusting the rear bolster alternately in opposite directions along the rear axle, substantially as set forth.

3. In a machine for making and repairing roads, the body-frame carrying a diagonally-adjustable scraper-blade and having its forward end pivoted upon a wheeled axle; a rear bolster upon which the rear end of the body-frame is pivoted; a relatively long rear axle upon which the rear bolster is supported for sliding adjustment; an adjusting mechanism for skewing the rear bolster, applied to opposite ends of the latter and arranged to be operated by and at will of an attendant standing upon the rear end of the body-frame, and an adjusting mechanism also arranged to be operated by and at will of said attendant and applied for shifting the rear bolster along the rear axle, substantially as set forth.

4. In a machine for making and repairing roads, the body-frame carrying a diagonally-adjustable scraper-blade and having its forward end pivoted upon a wheeled axle; a vibratory rear bolster upon which the rear end of the body-frame is supported; a long, wheeled rear axle provided with a longitudinally-arranged rack and supporting the rear bolster which is arranged to slide along said rear axle; and mechanism for adjusting the rear bolster along the rear axle comprising a gear-wheel supported by bearings upon the middle portion of the rear bolster and engaging the rack upon the rear axle, substantially as set forth.

5. In a machine for making and repairing roads, the body-frame carrying a diagonally-adjustable scraper-blade and having its forward end supported by a wheeled axle; a rear vibratory bolster upon which the rear end of the body-frame is supported; a long rear, wheeled axle upon which the rear bolster is arranged to slide; mechanism for skewing the rear bolster comprising a gear having a socket for an operating-key and power-transmitting connections between said gear and the end portions of the rear bolster; and mechanism for adjusting the rear bolster along the rear axle comprising a gear having a socket for an operating-key and engaging a rack upon the rear axle, substantially as described.

6. In a machine for making and repairing roads, the body-frame carrying a diagonally-adjustable scraper-blade; a rear bolster upon which the rear end of the body-frame is pivotally held; a long rear axle upon which the rear bolster is arranged to slide; and mechanism for skewing the rear bolster, comprising a rock-shaft having its ends connected with the ends of the rear bolster by crank-and-pitmen movements, and gearing for operating the rock-shaft, substantially as set forth.

7. In a machine for making and repairing roads, the body-frame carrying a diagonally-adjustable scraper-blade; the rear bolster having its middle portion provided with upper and lower trunnions journaled in upper and lower bearings on the body-frame, the lower one of said bearings being provided by a bent bar 20; and a long rear axle upon which the said bolster is arranged for sliding adjustment, substantially as set forth.

8. In a machine for making and repairing roads, a vibratory rear bolster supporting and pivotally connected with the rear end of the body-frame and supported to slide upon the rear axle, said bolster being constructed with middle and end bearing portions engaging upon the axle and rigidly connected together by bars 22, substantially as set forth.

9. In a machine for making and repairing roads, a vibratory rear bolster supporting and pivotally connected with the rear end of the body-frame and in turn arranged for sliding adjustment upon the rear axle; a gear 16 journaled in a rear extension of the middle portion of the rear bolster and engaging a rack on the rear axle; the said middle portion of the rear bolster being recessed so as to expose the rack on the rear axle to the said gear, and being divided into upper and lower parts which are fastened together, substantially as set forth.

10. In a machine for making and repairing roads, the body-frame having its rear end supported upon a vibratory bolster which is in turn arranged to slide upon the rear axle having a rack; a gear engaging said rack; and a catch normally engaging the gear as a means for locking the bolster against sliding movement upon the axle; said catch being arranged to be engaged by and forced away from the rack by an implement applied to separate the gear, substantially as described.

MORTON G. BUNNELL.

Witnesses:
A. F. DURAND.
MARGARET M. WAGNER.